United States Patent [19]
Padovani

[11] 3,917,788
[45] Nov. 4, 1975

[54] METHOD FOR MANUFACTURING A CONTAINER HAVING A THICKENED LIP

[76] Inventor: Pietro Padovani, 2, Lungadige Matteotti, Verona, Italy

[22] Filed: Feb. 5, 1974

[21] Appl. No.: 439,835

Related U.S. Application Data

[62] Division of Ser. No. 223,945, Feb. 7, 1972, Pat. No. 3,825,166.

[30] Foreign Application Priority Data

Feb. 13, 1971  Italy .................................. 84912/71

[52] U.S. Cl. ..................... 264/153; 264/92; 264/94; 264/163; 264/296; 425/292; 425/298; 425/388
[51] Int. Cl.² .................... B29C 17/04; B29C 17/10
[58] Field of Search ............ 264/89, 90, 92, 93, 94, 264/292, 296, 322, 153, 161, 163; 425/326, 387, 388, 398, 292, 298, 302, 305

[56] References Cited
UNITED STATES PATENTS

| | | | |
|---|---|---|---|
| 3,011,212 | 12/1961 | Marshall et al. | 264/90 |
| 3,321,562 | 5/1967 | Wanderer | 264/92 X |
| 3,551,954 | 1/1971 | Knowles | 425/398 |

Primary Examiner—Jan H. Silbaugh
Attorney, Agent, or Firm—Steinberg & Blake

[57] ABSTRACT

Method for making a container having a reinforced edge or lip. During molding of the container from thermoplastic sheet material, the edge is turned back and thickened in a hot condition by the mold closure action and the turned-back edge is elongated and trimmed.

5 Claims, 12 Drawing Figures

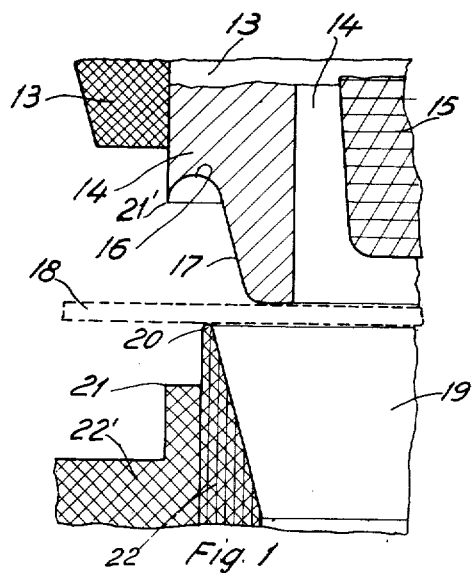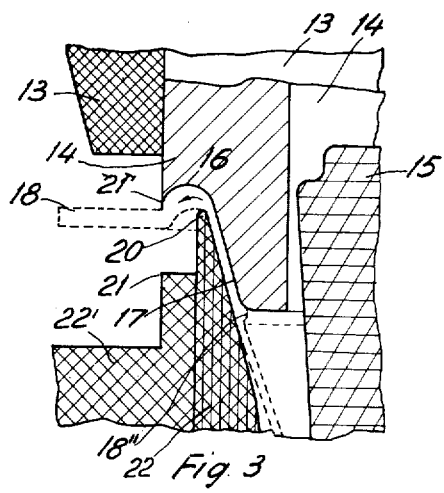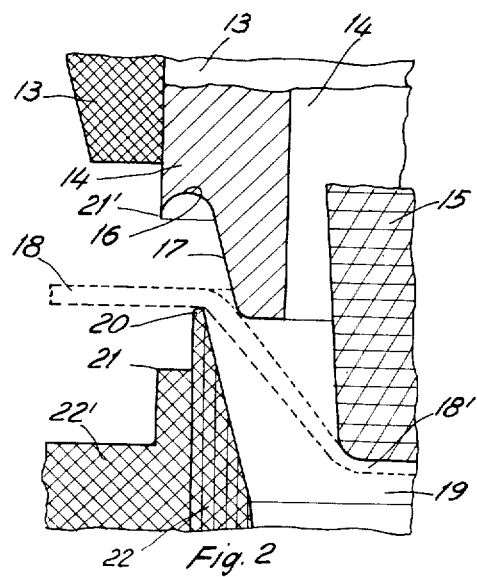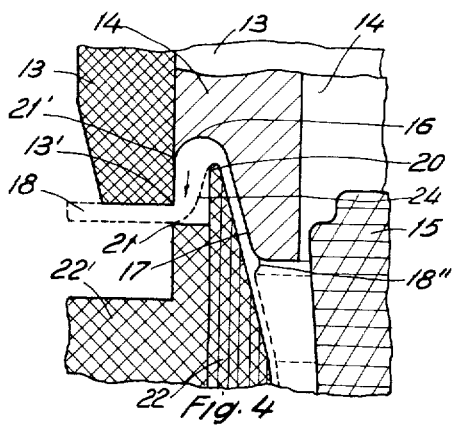

METHOD FOR MANUFACTURING A CONTAINER HAVING A THICKENED LIP

CROSS REFERENCE TO RELATED APPLICATION

This application is a division of copending application Ser. No. 223,945, filed Feb. 7, 1972, now U.S. Pat. No. 3,825,166, and entitled CONTAINER HAVING AN OPEN TOP SURROUNDED BY A LIP.

The present invention relates to a method for moulding an encircling torus or lip on the edge of an open-topped container during the moulding thereof from a thermoplastics sheet.

Containers made from sheets and having flanged-over edges are known, the edges serving to stiffen the container against lateral compressive stresses. The thickness of these flanged-over edges is normally equal to the thickness of the sheet used to produce the container. Consequently, the reinforcing of the cup edge against lateral compressive stresses is not very great and the flanged-over edges often fracture when such stresses are exerted thereon.

The method of the present invention moulds an edge torus or lip on such a container, and more particularly on an inverted frusto-conical cup or the like of thermoplastic material, to provide an edge which will withstand considerably greater compressive stresses than known flanged-over edges. This object is attained in that during moulding of the container, pressure is exerted on both sides of the upper edge region of the container, and thermoplastic material squeezed-out thereby in an upward and in a radially outward direction is prevented to form a thickening of the sheet, and the sheet at the edge of the thickening being drawn downwards, subject to elongation, and subsequently severed at this point.

By accumulating the squeezed-out material at the upper edge of the container, a thickening is at first produced in the still plasticized state of the material which is subsequently elongated and, in the elongated state, is severed from the remainder of the sheet. Due to the partial cooling-off occurring in the meantime, the natural resilience or elasticity of the thickening becomes so high that the material contracts to form a lip extending outwardly and downwardly and having a cross-section, the thickness of which is greater tl an the thickness of the sheet used for the production of the container.

The method of the invention is particularly useful in the production of a container in the form of an inverted frusto-conical cup or beaker having inclined walls of preferably constant thickness. Such a cup is substantially more stable, whilst at the same time simpler and cheaper to produce, than known cups or containers with flanged-over edges in the form of flat or arcuate flanges. By squeezing-out the material into the thickening which forms the lip, the material used is substantially no greater than in known edge arrangements. The known flanged-over edges are mostly moulded-on after producing the container itself. This additional operation is omitted in the method of the invention, since the lip may be moulded on directly during production of the cup of thermoplastics foil. For this purpose only a single moulding tool is required, so that machine costs may also be lowered.

The downward facing side of the lip which is formed after severing the foil from the thickening and whilst it is still in a readily plasticized state, may be upset thereon by a suitable tool of optional shape. This shaping may further increase the rigidity of the lip.

The container itself is formed in known manner by deep-drawing the clamped sheet in a matrix mould and subsequently applying excess or reduced pressure to intimately mould the sheet, plasticized by heat, against the matrix. This operation, however, only indirectly concerns the method of the invention and is therefore not described in detail.

To provide the moulded on lip with an expedient shape, the section of the outer surface preferably located between the cutting opening and above the normally stationary cutter extending substantially in an axial direction of the lower mould part, may form a chamber in the position at which the stationary cutter and the upper mould part are at their closest proximity to each other; the dimension of the chamber in a radial direction being greater than the thickness of the sheet. This shaping of the cutting opening and the chamber located behind it, firstly enables the production of a thickening of the thermoplastic material squeezed-out between the mould sections, and secondly permits elongation of this thickening within the chamber due to movement of the displaceable cutter downwards until the cutting edges of both cutters sever the remainder of the sheet adjacent the thickening. Thus, only the outer and upper surface of the thickening comes into contact with a tool whilst the inner and lower surface of the thickening, owing to the section of the outer surface of the lower mould section extending in an axial direction, does not come into contact with any of the moulding tools. After severing therefore, the thickening due to its inner elasticity, tends to be as flatly defined as possible within the surface which has come into contact with the displaceable cutter, whilst the surface parts which do not come into contact with any tool at all, tend to contract into a substantially circular cross-section.

The final shape of the lip, however, if required, can also be influenced in the still plasticized state by a suitable upsetting tool; the normally stationary cutter at the outer surface of the lower mould section, is axially displaceable after severing the sheet and the upper surface adjacent to the cutting edge is formed as an upsetting tool shape suitable for the given shape of the cup. The normally stationary cutter is actually stationary during the moulding of the lip, but may subsequently be axially displaced.

For further reinforcement of the edge of the container or cup, the surface of the upper mould section abutting on the inside surface of the upper wall region of the cup may be bent inwards at the lower end of this wall region. This also causes some sheet material to be squeezed-out downwardly, so that an annular thickening is produced at a lower end portion of the upper wall region of the container or cup carrying the lip. This thickening also contributes to the reinforcing against pressure stresses.

The invention will be described further, by way of example, with reference to the accompanying drawings, in which:

FIGS. 1 to 6 are partial axial sections through moulding apparatus sections required for carrying out the method of the invention and shown during successive steps of the method;

Figure 5:
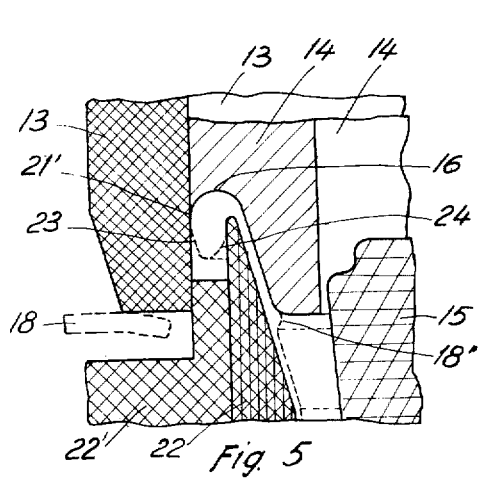

Identical or corresponding parts are provided with identical reference numerals in the drawings. FIG. 1 shows a level sheet 18 of thermoplastic material which has been brought to the temperature necessary for moulding a container and has been subsequently passed between a lower mould part 22, a tension or clamping element 15, an upper mould part 14 and a cutter 13, without making contact with these parts. As known from conventional moulding methods, the clamping element 15 elongates the material and, as shown at position 18', causes it to become thin-walled in the direction towards the base (not shown) of the cavity 19 of the lower mould part 22.

The upper mould part 14 is lowered, at a suitable speed in the direction towards the lower mould part 22 until, by means of its conical surface 17, it presses the material against the tapering wall of the upper part of the cavity 19 (FIG. 3). The pressure exerted by the surface 17 causes a proportion of the material of the sheet to flow out over the upper edge 20 of the lower mould part in the direction of the arrow to the point where the annular recess 16 conducts the material from the mould part 14 into the region at which the lip is formed and which is located between the edge 20 of the mould part 22 and the outer edge or rim 21' of the mould part 14 with a resultant thickening of the sheet in this region. At the same time, the upper mould part causes a cooling of the material with its conical surface 17 and prevents the material from being further stretched; an annular thickening 18" (FIG. 3) being formed which constitutes a particular bracing against stresses acting in a radial direction of the side walls of the container. There subsequently occurs an elongation and cutting-off of the edge and this may occur before the time at which excess or reduced pressure is produced in the interior of the cavity 19 to cause the foil to abut against the side wall and base of the mould. The cutter 13 with the cutting edge 13' exerts a tractive action in the direction of the arrow in FIG. 4 which is rendered possible by the height of the cutting opening (21, 21') which in any case exceeds the thickness of the sheet 18.

As shown in FIG. 4, the inside surface 24 of the thickened portion which later forms the inside surface of the lip, does not come into contact with the metal parts.

The cutter 13 continues its movement until, together with the fixed cutter 22' having a cutting edge 21, it causes the separation of the container from the remaining or surplus sheet, and the lower part of the thickening (FIG. 5) whereupon the thickened portion is no longer subject to an elongating effect and contracts and moves upwards to form the required lip.

It is to be noted that the outer surface 23 of the thickening which, even if only for a short period, has come into contact with the cutter 13 tends to maintain a straight line profile, whilst the inside surface 24 which has not come into contact with the metal parts, permits unobstructed contraction of the material. The material therefore tends to form a torus or lip, assumes a curved shape on the inside surface of the lip and at the same time exerts a tractive or pulling effect on the region of the lower apex of the lip.

The container may be ejected from the mould as soon as the clamping element 15 of the upper mould part 14 and the cutter 13 are raised.

Figure 6:
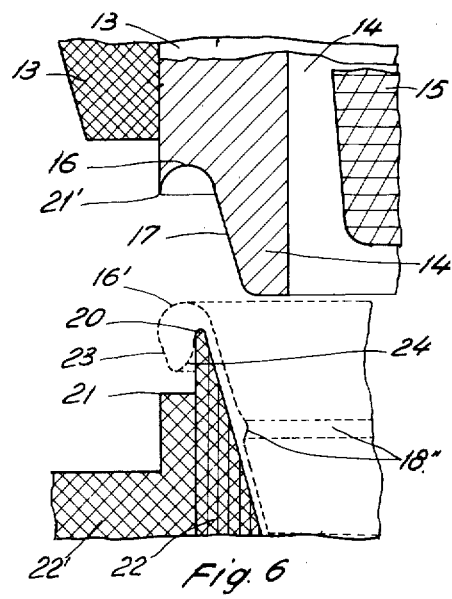
Figure 7:
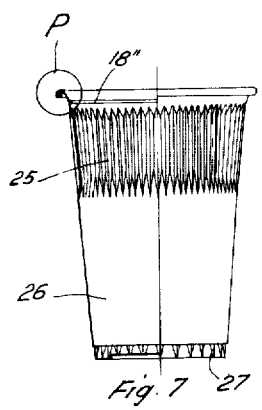
FIG. 7 is an axial section in the left-hand half thereof and a side view in the right-hand half thereof, of a cup having a lip moulded thereon.
Figure 8:
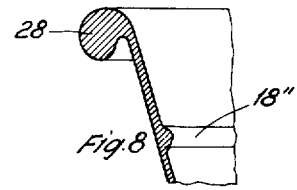
FIGS. 8 to 12 are enlarged partial sections through upper wall regions of cups made of thermoplastics sheet showing various embodiments of the moulded-on lip.
Figure 9:
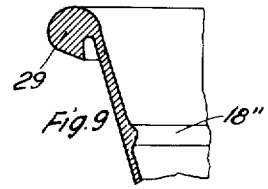
Figure 10:
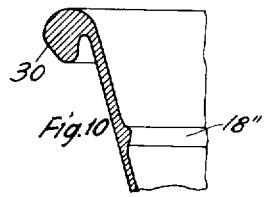
Figure 11:
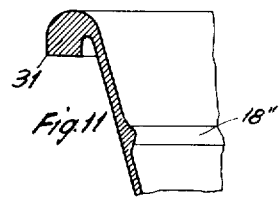
Figure 12:
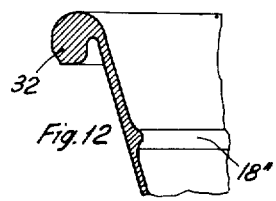

For better understanding of FIGS. 1 to 6, FIG. 7 shows a completed container in the form of a cup with side wall 26, a ribbing 27 for bracing the base portion and special grooves 26 to reinforce the upper part, which towards the top has a predetermined slope or bevelling and a lip of full or solid cross-section, which are substantially identical with the corresponding parts in FIG. 6. The portion enclosed by the circle P is reproduced in various alternative embodiments in FIGS. 8 to 12, the development of the edges or rims 28, 29, 30, 32 apparently depending directly upon the given shape of the cutters 22' used as the upsetting tool, the different shapes of which not being shown in the drawings but are conversant to the expert, since they may be readily derived from the final shape of the lip.

I claim:

1. A method for providing an encircling lip at the edge of a container which has an open top end and an opposed bottom end during molding of the container from a thermoplastic sheet material while the sheet material is at an elevated temperature and in a flowable condition, the steps of squeezing the sheet material at the region adjacent said open top end while restricting outward flow of the squeezed sheet material as well as flow thereof away from said bottom end to form a thickened lip portion encircling the open top end of the container and having an outer peripheral edge, engaging the thickened lip portion at its outer peripheral edge and stretching the thickened lip portion while it is still in a plastic, flowable condition toward the bottom end of the container to provide the container at its lip end portion with a stretched flange surrounding the previously squeezed region of the thermoplastic sheet material and having an inner surface spaced from and directed toward said previously squeezed region and an outer surface directed away therefrom, and while the lip portion is in its stretched condition severing the thermoplastic sheet material from the thus-stretched lip portion at said peripheral edge thereof so that the stretched portion snaps back upon itself for increasing the thickness of said flange while shortening the length thereof.

2. The method of claim 1 and wherein the inner surface of the stretched flange is maintained out of engagement with and spaced from mold components so as to enhance the freedom of the stretched lip portion to snap back upon itself after severing of the remainder of the sheet material from the lip portion at said peripheral edge thereof.

3. The method of claim 2 and including the step of upsetting the lip portion after it snaps back upon itself to provide the lip portion with a predetermined configuration.

4. The method of claim 1 and including the step of upsetting the lip portion after it snaps back upon itself to provide the lip portion with a predetermined configuration.

5. The method of claim 1 and including the step of squeezing from said region of said thermoplastic sheet material, simultaneously with the squeezing of said thickened lip portion, an internal annular bracing rib.

* * * * *